United States Patent
Ando et al.

(10) Patent No.: US 9,180,871 B2
(45) Date of Patent: Nov. 10, 2015

(54) HYBRID VEHICLE AND CONTROL METHOD FOR HYBRID VEHICLE

(71) Applicants: Ikuo Ando, Toyota (JP); Toshitake Sasaki, Toyota (JP); Tsukasa Abe, Gotenba (JP); Masato Terashima, Toyota (JP); Koji Hayashi, Nagakute (JP); Hiroyasu Harada, Toyota (JP); Masakazu Yamamoto, Kariya (JP)

(72) Inventors: Ikuo Ando, Toyota (JP); Toshitake Sasaki, Toyota (JP); Tsukasa Abe, Gotenba (JP); Masato Terashima, Toyota (JP); Koji Hayashi, Nagakute (JP); Hiroyasu Harada, Toyota (JP); Masakazu Yamamoto, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 14/359,500

(22) PCT Filed: Nov. 23, 2012

(86) PCT No.: PCT/IB2012/002476
§ 371 (c)(1),
(2) Date: May 20, 2014

(87) PCT Pub. No.: WO2013/076570
PCT Pub. Date: May 30, 2013

(65) Prior Publication Data
US 2014/0297088 A1 Oct. 2, 2014

(30) Foreign Application Priority Data
Nov. 25, 2011 (JP) ................. 2011-257367

(51) Int. Cl.
B60W 10/06 (2006.01)
B60W 20/00 (2006.01)
(Continued)

(52) U.S. Cl.
CPC ............ *B60W 20/1084* (2013.01); *B60K 6/445* (2013.01); *B60W 10/06* (2013.01);
(Continued)

(58) Field of Classification Search
CPC ..... B60W 10/06; B60W 10/08; B60W 10/26; B60W 20/1084; Y10S 903/93
USPC .......................................................... 701/22
See application file for complete search history.

(56) References Cited

U.S. PATENT DOCUMENTS 6,131,680 A 10/2000 Nii et al.
6,343,252 B1 1/2002 Asami et al.
(Continued)

FOREIGN PATENT DOCUMENTS

DE 100 16 123 A1 10/2001
DE 10 2007 010 197 A1 9/2008
(Continued)

*Primary Examiner* — Mary Cheung
*Assistant Examiner* — Michael Berns
(74) *Attorney, Agent, or Firm* — Oliff PLC

(57) ABSTRACT

A hybrid vehicle including an engine having a catalyst in an exhaust passage, first and second motor generators, a battery and a power transmission mechanism coupling a drive shaft, the engine and the motor generators by a gear mechanism such that torque is transmittable, and its control method, are provided. When a coolant temperature is a threshold or below, catalyst warm-up operation for starting the engine and retarding an ignition timing by a retardation amount is executed. When a battery level is a threshold or below, forced charging operation for starting the engine and charging the battery by driving the first motor generator is executed. During the forced charging operation, an engine load is changed on the basis of the battery level. When the catalyst warm-up operation is executed during the forced charging operation, the retardation amount for facilitating warm-up of the catalyst is reduced as the engine load increases.

6 Claims, 8 Drawing Sheets

(51) Int. Cl.
  *B60K 6/445* (2007.10)
  *B60W 10/08* (2006.01)
  *B60W 10/30* (2006.01)
  *B60W 10/26* (2006.01)
  *B60W 30/18* (2012.01)

(52) U.S. Cl.
  CPC .............. *B60W 10/08* (2013.01); *B60W 10/26* (2013.01); *B60W 10/30* (2013.01); *B60W 20/1082* (2013.01); *B60W 30/18054* (2013.01); *B60W 2510/068* (2013.01); *B60W 2510/244* (2013.01); *B60W 2530/12* (2013.01); *Y02T 10/54* (2013.01); *Y02T 10/6239* (2013.01); *Y02T 10/6286* (2013.01); *Y10S 903/93* (2013.01)

(56) References Cited

U.S. PATENT DOCUMENTS

| | | | |
|---|---|---|---|
| 7,869,912 B2 * | 1/2011 | Kishimoto | 701/22 |
| 8,499,547 B2 * | 8/2013 | Mitsutani | 60/284 |
| 2003/0051930 A1 | 3/2003 | Matsubara et al. | |
| 2007/0219702 A1 | 9/2007 | Kishimoto | |
| 2009/0259391 A1 | 10/2009 | Ando et al. | |
| 2010/0107608 A1 * | 5/2010 | Mitsutani | 60/285 |
| 2010/0108032 A1 * | 5/2010 | Pursifull et al. | 123/406.12 |
| 2010/0152938 A1 * | 6/2010 | Aoki et al. | 701/22 |
| 2010/0185349 A1 * | 7/2010 | Harada et al. | 701/22 |
| 2010/0241297 A1 | 9/2010 | Aoki et al. | |
| 2010/0251996 A1 | 10/2010 | Akimoto | |

FOREIGN PATENT DOCUMENTS

| | | |
|---|---|---|
| JP | A-09-308012 | 11/1997 |
| JP | A-2001-132487 | 5/2001 |
| JP | 2003-083110 A | 3/2003 |
| JP | A-2006-258020 | 9/2006 |
| JP | A-2007-126097 | 5/2007 |
| JP | 2007-245852 A | 9/2007 |
| JP | A-2008-238965 | 10/2008 |
| JP | A-2008-284909 | 11/2008 |
| JP | A-2009-126450 | 6/2009 |
| JP | A-2010-241170 | 10/2010 |

* cited by examiner

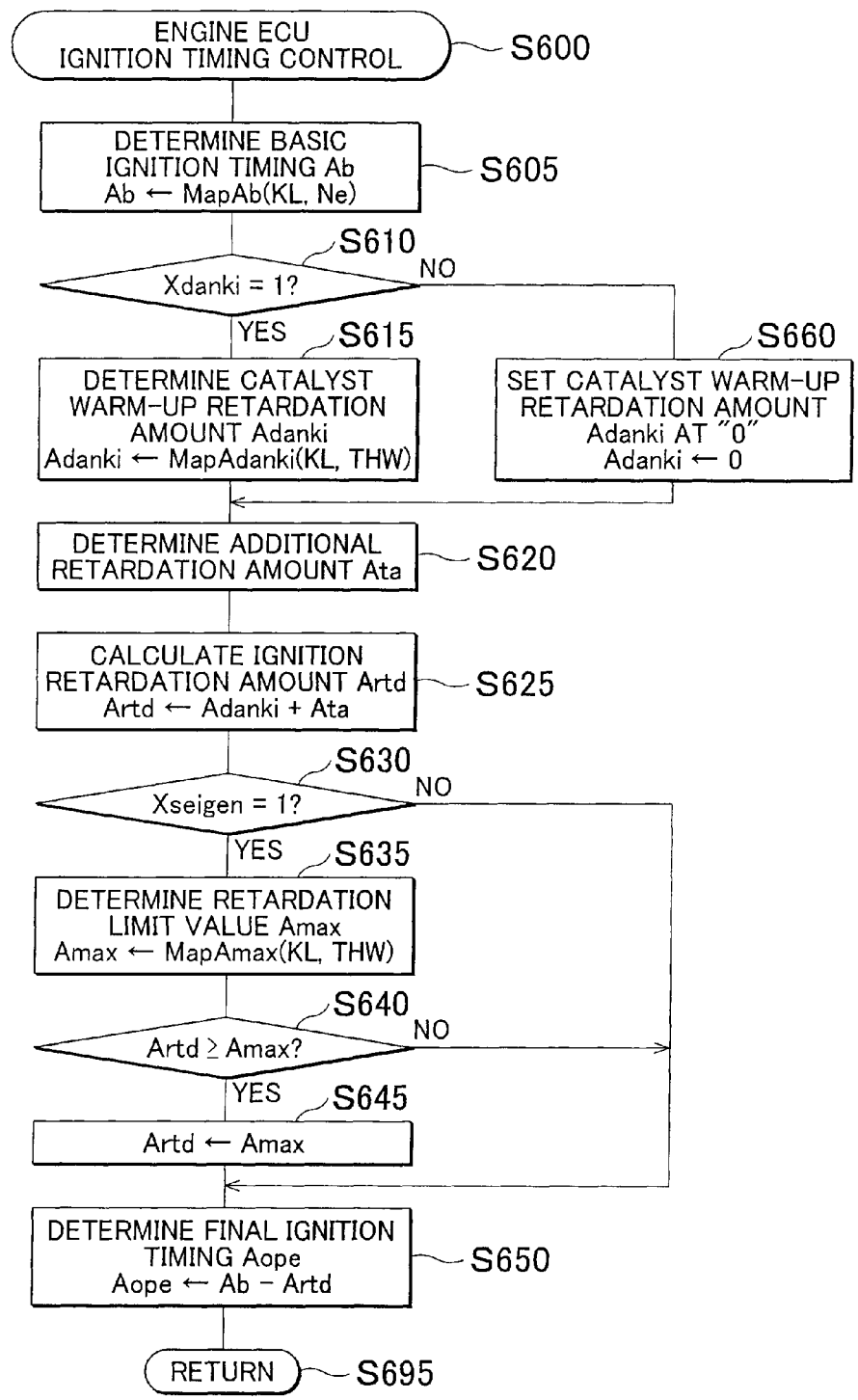

HYBRID VEHICLE AND CONTROL METHOD FOR HYBRID VEHICLE

INCORPORATION BY REFERNECE

The disclosure of Japanese Patent Application No. 2011-257367 filed on Nov. 25, 2011, including the specification, drawings and abstract is incorporated herein by reference in its entirety.

BACKGROUND OF THE INVENTION

1. Field of the Invention

The invention relates to a hybrid vehicle that includes an internal combustion engine having an exhaust gas purification catalyst in an exhaust passage, an electric motor, a generator and an electrical storage device, and a control method for the hybrid vehicle.

2. Description of Related Art

A hybrid vehicle includes an internal combustion engine (hereinafter, simply referred to as "engine") and an electric motor as driving sources that generate driving force for propelling the vehicle. That is, the hybrid vehicle travels by transmitting torque generated by at least one of the engine and the electric motor to a drive shaft connected to drive wheels of the vehicle.

On the other hand, in the hybrid vehicle as well, as well as a vehicle that includes only an ordinary engine as a driving source, an exhaust gas purification catalyst is arranged in an exhaust passage of the engine. The exhaust gas purification catalyst is, for example, a three-way catalyst, and is, hereinafter, simply referred to as "catalyst". Generally, a catalyst exhibits high exhaust gas purification performance when the temperature of the catalyst (catalyst bed temperature) is higher than or equal to a predetermined activating temperature. Thus, when the temperature of the catalyst is low at the time of a start of operation of the hybrid vehicle (that is, at the time of a system start-up), or the like, the engine is started and an exhaust gas temperature is increased by retarding an ignition timing with respect to a "normal ignition timing". By so doing, "catalyst warm-up operation" for early increasing the temperature of the catalyst is performed. Note that the "normal ignition timing" is an ignition timing referred to as "reference ignition timing, optimal ignition timing, basic ignition timing, or the like", and is set to an ignition timing at which a combustion state is good and the efficiency of the engine is high.

On the other hand, the electrical storage device included in the hybrid vehicle is appropriately charged with regenerative energy and the power of the engine during operation of the hybrid vehicle. Thus, the remaining level of the electrical storage device is kept at an appropriate value. The remaining level of the electrical storage device is, for example, indicated by a parameter that indicates a state of charge (SOC).

Incidentally, for example, when the hybrid vehicle is not operated for an extended period of time and, therefore, the electrical storage device has been subjected to self-discharge, when the vehicle has been left standing for an extended period of time in neutral position after a system start-up of the vehicle, or the like, the remaining level of the electrical storage device can remarkably decrease. In such a case, the hybrid vehicle starts the engine to drive the generator. By so doing, the electrical storage device is charged. Operation that performs such charging is also referred to as "forced charging operation" (for example, see Japanese Patent Application Publication No. 2008-238965 (JP 2008-238965 A)).

Incidentally, in forced charging operation, for example, it is required to more quickly charge the electrical storage device as the remaining level of the electrical storage device decreases, so it is desirable to increase the amount of electric power generated by the generator by increasing the power of the engine as the remaining level decreases. As a result, during forced charging operation, a load of the engine increases as the remaining level of the electrical storage device decreases.

On the other hand, when the system is started up in the case where the catalyst temperature is low and the remaining level of the electrical storage device is extremely low, it is desirable to perform both catalyst warm-up operation and forced charging operation. However, it has been found that, when these two operations are simply performed at the same time, torque fluctuations of the engine increase due to a retarded ignition timing, particularly, in the case where the load of the engine increases through forced charging operation, torsional resonance occurs in a power transmission system due to the torque fluctuations and, as a result, hunting of an engine rotation speed occurs, and large noise (tooth hammer sound) may occur due to a collision of gears in a power transmission mechanism.

SUMMARY OF THE INVENTION

The invention provides a hybrid vehicle in which large tooth hammer sound does not occur in the case where catalyst warm-up operation is performed during forced charging operation, and a control method for the hybrid vehicle.

A first aspect of the invention provides a hybrid vehicle that includes: an internal combustion engine that includes an exhaust gas purification catalyst in an exhaust passage; an electric motor; an electrical storage device that supplies the electric motor with electric power for driving the electric motor; a generator that generates electric power for charging the electrical storage device using power of the internal combustion engine; a power transmission mechanism that couples a drive shaft of a vehicle to the internal combustion engine such that torque is transmittable and that couples the drive shaft to the electric motor such that torque is transmittable; and a control device that generates torque required to rotate the drive shaft by controlling at least torque generated by the internal combustion engine and torque generated by the electric motor, and that changes the electric power generated by the generator by controlling the power generated by the internal combustion engine.

The power transmission mechanism may be a mechanism that couples the drive shaft of the vehicle, the internal combustion engine, the electric motor and the generator to one another such that torque is transmittable, and the control device may be a device that controls torque required to rotate the drive shaft and electric power generated by the generator by controlling torque generated by the internal combustion engine, torque generated by the electric motor and torque generated by the generator.

Furthermore, in the hybrid vehicle, the control device executes a catalyst warm-up operation and a forced charging operation.

In the catalyst warm-up operation, the internal combustion engine is started and an ignition timing of the internal combustion engine is retarded by a predetermined retardation amount with respect to a reference ignition timing when a catalyst temperature parameter that is a parameter that correlates with a temperature of the catalyst is lower than or equal to a predetermined temperature correlated threshold. For example, in the catalyst warm-up operation the catalyst warm-up operation is started when a coolant temperature of the engine, which is one of the catalyst temperature parameters, is lower than or equal to the predetermined temperature correlated threshold at the time of a start-up of a system of the hybrid vehicle.

In the forced charging operation, the electrical storage device is charged by causing the generator to generate electric power through starting the internal combustion engine when a remaining level parameter that is a parameter that correlates with a remaining level of the electrical storage device is lower than or equal to a predetermined remaining level correlated threshold. For example, in the forced charging operation the forced charging operation is started when the remaining level parameter is lower than or equal to the predetermined remaining level correlated threshold at the time of a start-up of the system.

In addition, in the forced charging operation, the internal combustion engine is operated by changing the load required for the internal combustion engine on the basis of the remaining level parameter, and in the catalyst warm-up operation the predetermined retardation amount is reduced as the load of the internal combustion engine increases when both the forced charging operation and the catalyst warm-up operation are executed at the same time.

Another aspect of the invention provides a control method for a hybrid vehicle that includes: an internal combustion engine that includes an exhaust gas purification catalyst in an exhaust passage; an electric motor; an electrical storage device that supplies the electric motor with electric power for driving the electric motor; a generator that generates electric power for charging the electrical storage device using power of the internal combustion engine; and a power transmission mechanism that couples a drive shaft of a vehicle to the internal combustion engine such that torque is transmittable and that couples the drive shaft to the electric motor such that torque is transmittable. The control method includes: executing catalyst warm-up operation for starting the internal combustion engine and retarding an ignition timing of the internal combustion engine by a predetermined retardation amount with respect to a reference ignition timing when a catalyst temperature parameter that is a parameter that correlates with a temperature of the catalyst is lower than or equal to a predetermined temperature correlated threshold; executing the forced charging operation for charging the electrical storage device by starting the internal combustion engine when a remaining level parameter that is a parameter that correlates with a remaining level of the electrical storage device is lower than or equal to a predetermined remaining level correlated threshold, and causing the generator to generate electric power by operating the internal combustion engine while changing a load required for the internal combustion engine on the basis of the remaining level parameter; and reducing the retardation amount as the load of the internal combustion engine increases when both the forced charging operation and the catalyst warm-up operation are executed at the same time.

With the above-described hybrid vehicle and control method therefor, when the remaining level of the electrical storage device is low, the load required for the engine (actually, engine required power) is changed such that the amount of electric power generated by the generator is changed on the basis of the remaining level. That is, the forced charging operation is executed. At this time, when warm-up of the catalyst is required, as in the case where the forced charging operation is not executed, the ignition timing is retarded from the reference ignition timing. However, the retardation amount at this time is reduced as the load of the internal combustion engine increases. Thus, even when the load of the internal combustion engine increases through the forced charging operation, it is possible to suppress output torque fluctuations of the engine due to retardation of the ignition timing for warm-up of the catalyst. As a result, while avoiding occurrence of large tooth hammer sound, it is possible to achieve both charging the electrical storage device and facilitating warm-up of the catalyst.

In addition, in the hybrid vehicle, in the catalyst warm-up operation the predetermined retardation amount may be set when both the forced charging operation and the catalyst warm-up operation are executed to a value that is smaller than or equal to a maximum value of the predetermined retardation amount when the forced charging operation is not executed and the catalyst warm-up operation is executed.

With the above-described hybrid vehicle, the retardation amount at the time when both the forced charging operation and the catalyst warm-up operation are executed at the same time is set to a value that does not lead to large torque fluctuations of the engine, causing tooth hammer sound. As a result, while avoiding occurrence of large tooth hammer sound, it is possible to achieve both charging the electrical storage device and facilitating warm-up of the catalyst.

In addition, in the hybrid vehicle, in the catalyst warm-up operation a reference retardation amount may be determined on the basis of the load of the internal combustion engine and the catalyst temperature parameter, the determined reference retardation amount may be used as the predetermined retardation amount when the forced charging operation is not executed and the catalyst warm-up operation is executed and a limited retardation amount that is obtained by limiting the determined reference retardation amount by a retardation limit value, which reduces as the load of the internal combustion engine increases, may be used as the predetermined retardation amount when both the forced charging operation and the catalyst warm-up operation are executed.

With the above-described hybrid vehicle, it is possible to effectively warm up the catalyst at the time of executing normal catalyst warm-up operation in which the forced charging operation is not executed and the catalyst warm-up operation is executed. Furthermore, when both the forced charging operation and the catalyst warm-up operation are executed at the same time, it is possible to increase the retardation amount within the range that does not lead to tooth hammer sound, so it is possible to facilitate warm-up of the catalyst.

In addition, in the catalyst warm-up operation the catalyst warm-up operation may be started when the catalyst temperature parameter is lower than or equal to the predetermined temperature correlated threshold at the time of a start-up of a system of the hybrid vehicle, and in the forced charging operation the forced charging operation may be started when the remaining level parameter is lower than or equal to the predetermined remaining level correlated threshold at the time of a start-up of the system.

Furthermore, the power transmission mechanism may couple the internal combustion engine to the drive shaft via only a plurality of gears. The thus-configured power transmission mechanism has no portion that absorbs fluctuations in torque output from the internal combustion engine, so tooth hammer sound is highly likely to occur. Thus, the invention is particularly effective in a hybrid vehicle that includes such a power transmission mechanism.

Problems and advantages associated with or related to the invention easily become apparent from description of embodiments of the invention described with reference to the following drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart that shows an ignition timing control routine executed by the CPU of the engine ECU shown in FIG. 1;

DETAILED DESCRIPTION OF EMBODIMENTS

Figure 1:
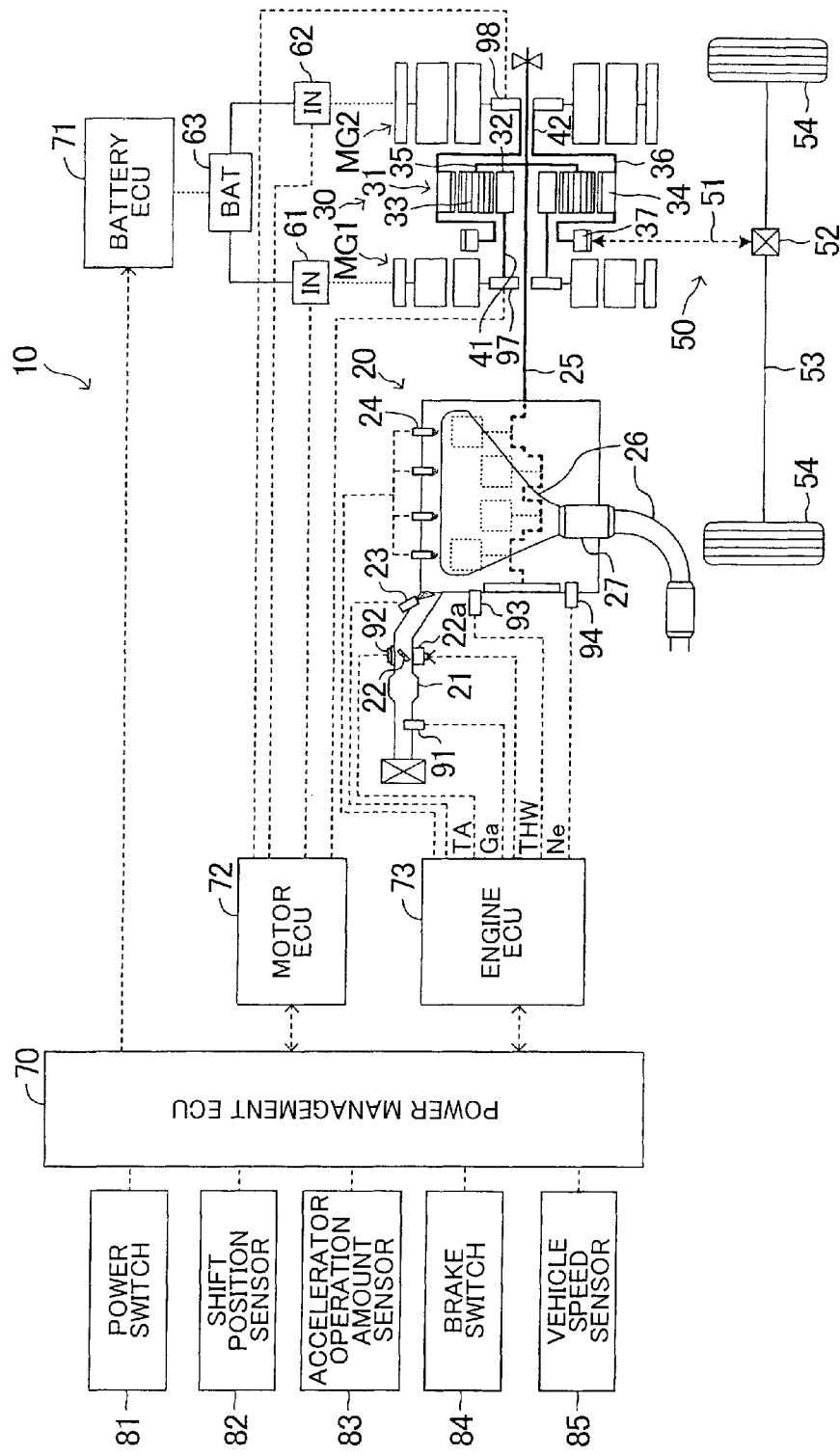
FIG. 1 is a schematic view of a hybrid vehicle according to an embodiment of the invention.

Hereinafter, a hybrid vehicle according to an embodiment of the invention will be described with reference to the accompanying drawings. First, the configuration of the embodiment will be described. As shown in FIG. 1, the hybrid vehicle 10 according to the present embodiment includes a motor generator MG1, a motor generator MG2, an internal combustion engine 20, a power distribution mechanism 30, a driving force transmission mechanism 50, a first inverter 61, a second inverter 62, a battery 63, a power management ECU 70, a battery ECU 71, a motor ECU 72 and an engine ECU 73. Note that the word "ECU" is an abbreviation of electronic control unit, and is an electronic control circuit that has a microcomputer as a major component. The microcomputer includes a CPU, a ROM, a RAM, an interface, and the like.

The motor generator MG1 is a synchronous motor generator that is able to function as not only a generator but also an electric motor. The motor generator MG1 is also referred to as the first motor generator MG1 for the sake of convenience. The first motor generator MG1 mainly functions as a generator in the present embodiment. The first motor generator MG1 includes an output shaft (hereinafter, also referred to as "first shaft") 41.

The motor generator MG2, as well as the first motor generator MG1, is a synchronous motor generator that is able to function as not only a generator but also an electric motor. The motor generator MG2 is also referred to as the second motor generator MG2 for the sake of convenience. The second motor generator MG2 mainly functions as a motor in the present embodiment. The second motor generator MG2 includes an output shaft (hereinafter, also referred to as "second shaft") 42.

The engine 20 is a four-cycle spark-ignition multi-cylinder internal combustion engine. The engine 20 includes an intake passage unit 21, a throttle valve 22, a throttle valve actuator 22a, a plurality of fuel injection valves 23, a plurality of ignition devices 24, a crankshaft 25, an exhaust passage unit 26 and a three-way catalyst 27. The intake passage unit 21 includes an intake pipe and an intake manifold. The plurality of ignition devices 24 each include an ignition plug. The crankshaft 25 is the output shaft of the engine 20. The exhaust passage unit 26 includes an exhaust manifold and an exhaust pipe.

The throttle valve 22 is rotatably supported in the intake passage unit 21. The throttle valve actuator 22a is able to change the passage cross-sectional area of the intake passage unit 21 by rotating the throttle valve 22 in response to an instruction signal from the engine ECU 73. Each of the fuel injection valves 23 is arranged in an intake port of a corresponding one of cylinders, and is able to change a fuel injection amount in response to an instruction signal from the engine ECU 73.

Each ignition device 24 that includes the ignition plug generates ignition spark in a combustion chamber of a corresponding one of the cylinders at a predetermined timing in response to an instruction signal from the engine ECU 73. The three-way catalyst (catalyst) 27 is an exhaust gas purification catalyst, and is arranged at an exhaust gas collecting portion of the exhaust manifold. That is, the catalyst 27 is provided in the exhaust passage unit 26 of the engine 20, and purifies unburned substances (HC, CO, and the like) and NOx that are emitted from the engine 20. Note that the engine 20 may include a variable intake valve timing control device (VVT) (not shown).

The engine 20 is able to change a torque generated by the engine 20 and an engine rotation speed (thus, engine power) by, for example, changing a fuel injection amount and changing an intake air amount through changing the opening degree of the throttle valve 22 with the use of the throttle valve actuator 22a. Furthermore, the engine 20 is able to increase the temperature of exhaust gas emitted from the engine 20 by retarding the ignition timing with respect to a reference ignition timing.

The power distribution mechanism 30 includes a known planetary gear unit 31. The planetary gear unit 31 includes a sun gear 32, a plurality of pinions 33 and a ring gear 34.

The sun gear 32 is connected to the first shaft 41 of the first motor generator MG1. Thus, the first motor generator MG1 is able to output torque to the sun gear 32. Furthermore, the first motor generator MG1 is able to generate electric power as the first motor generator MG1 is driven for rotation by torque input from the sun gear 32 to the first motor generator MG1 (first shaft 41).

Each of the plurality of pinions 33 is in mesh with the sun gear 32 and is in mesh with the ring gear 34. A rotary shaft (rotation shaft) of each pinion 33 is provided on a planetary carrier 35. The planetary carrier 35 is retained so as to be rotatable coaxially with the sun gear 32. Thus, each pinion 33 is able to revolve around the sun gear 32 while rotating around its axis. The planetary carrier 35 is connected to the crankshaft 25 of the engine 20. Thus, each pinion 33 can be driven for rotation by torque input from the crankshaft 25 to the planetary carrier 35.

The ring gear 34 is retained so as to be rotatable coaxially with the sun gear 32. As described above, each pinion 33 is in mesh with the sun gear 32 and the ring gear 34. Thus, when torque is input from the pinions 33 to the sun gear 32, the sun gear 32 is driven for rotation by the torque. When torque is input from the pinions 33 to the ring gear 34, the ring gear 34 is driven for rotation by the torque. Conversely, when torque is input from the sun gear 32 to the pinions 33, the pinions 33 are driven for rotation by the torque. When torque is input from the ring gear 34 to the pinions 33, the pinions 33 are driven for rotation by the torque.

The ring gear 34 is connected to the second shaft 42 of the second motor generator MG2 via a ring gear carrier 36. Thus, the second motor generator MG2 is able to output torque to the ring gear 34. Furthermore, the second motor generator MG2 is able to generate electric power as the second motor generator MG2 is driven for rotation by torque input from the ring gear 34 to the second motor generator MG2 (second shaft 42).

Furthermore, the ring gear 34 is connected to an output gear 37 via the ring gear carrier 36. Thus, the output gear 37 can be driven for rotation by torque input from the ring gear 34 to the output gear 37. The ring gear 34 can be driven for rotation by torque input from the output gear 37 to the ring gear 34.

The driving force transmission mechanism 50 includes a gear train 51, a differential gear 52 and a drive shaft 53.

The gear train 51 connects the output gear 37 to the differential gear 52 by a gear mechanism such that power is transmittable. The differential gear 52 is connected to the drive shaft 53. Drive wheels 54 are respectively connected to both ends of the drive shaft 53. Thus, torque from the output gear 37 is transmitted to the drive wheels 54 via the gear train 51, the differential gear 52 and the drive shaft 53. The hybrid vehicle 10 is able to travel by using the torque transmitted to the drive wheels 54.

The first inverter 61 is electrically connected to the first motor generator MG1 and the battery 63. Thus, when the first motor generator MG1 is generating electric power, electric power generated by the first motor generator MG1 is supplied to the battery 63 via the first inverter 61. Conversely, the first motor generator MG1 is driven for rotation by electric power supplied from the battery 63 via the first inverter 61.

The second inverter 62 is electrically connected to the second motor generator MG2 and the battery 63. Thus, the second motor generator MG2 is driven for rotation by electric power supplied from the battery 63 via the second inverter 62. Conversely, when the second motor generator MG2 is generating electric power, electric power generated by the second motor generator MG2 is supplied to the battery 63 via the second inverter 62.

Note that it is possible to directly supply electric power generated by the first motor generator MG1 to the second motor generator MG2, and it is possible to directly supply electric power generated by the second motor generator MG2 to the first motor generator MG 1.

The battery 63 is a nickel metal hydride battery in the present embodiment. However, the battery 63 just needs to be a chargeable and dischargeable electrical storage device, and may be a lithium ion battery or another secondary battery.

The power management ECU 70 (hereinafter, referred to as "PMECU 70") is connected to the battery ECU 71, the motor ECU 72 and the engine ECU 73 so as to be able to exchange information with them through communication.

The PMECU 70 is connected to a power switch 81, a shift position sensor 82, an accelerator operation amount sensor 83, a brake switch 84, a vehicle speed sensor 85, and the like, and receives output signals generated by these sensors.

The power switch 81 is a system start-up switch of the hybrid vehicle 10. The PMECU 70 is configured to start up the system (make the system enter a ready-on state) when a vehicle key (not shown) is inserted into a key slot (not shown) and the power switch 81 is operated while a brake pedal (not shown) is depressed.

The shift position sensor 82 generates a signal that indicates a shift position selected by a shift lever (not shown) that is provided near a driver seat of the hybrid vehicle 10 so as to be operational by a driver. The shift position includes P (parking position), R (reverse position), N (neutral position) and D (driving position).

The accelerator operation amount sensor 83 generates an output signal that indicates an operation amount (accelerator operation amount AP) of an accelerator pedal (not shown) provided so as to be operational by the driver. The brake switch 84 generates an output signal that indicates that the brake pedal (not shown) is in an operated state when the brake pedal provided so as to be operational by the driver is operated. The vehicle speed sensor 85 generates an output signal that indicates a vehicle speed SPD.

The PMECU 70 receives a remaining level (state of charge) SOC of the battery 63, calculated by the battery ECU 71. The remaining level SOC is a parameter that correlates with the remaining level of the battery 63, so the remaining level SOC is also referred to as remaining level parameter. The remaining level SOC is calculated by a known method on the basis of, for example, an accumulated value of current flowing into or flowing out from the battery 63.

The PMECU 70 receives a signal that indicates a rotation speed of the first motor generator MG1 (hereinafter, referred to as "MG1 rotation speed Nm1") and a signal that indicates a rotation speed of the second motor generator MG2 (hereinafter, referred to as "MG2 rotation speed Nm2") via the motor ECU 72.

Note that the MG1 rotation speed Nm1 is calculated by the motor ECU 72 on the basis of an output value of a resolver 97 that is provided for the first motor generator MG1 and that outputs an output value corresponding to a rotation angle of a rotor of the first motor generator MG1. Similarly, the MG2 rotation speed Nm2 is calculated by the motor ECU 72 on the basis of an output value of a resolver 98 that is provided for the second motor generator MG2 and that outputs an output value corresponding to a rotation angle of a rotor of the second motor generator MG2.

The PMECU 70 receives various output signals that indicate an engine state via the engine ECU 73. The output signals that indicate an engine state include an engine rotation speed Ne, a throttle valve opening degree TA, an engine coolant temperature THW, and the like.

The motor ECU 72 is connected to the first inverter 61 and the second inverter 62, and transmits instruction signals to the inverters on the basis of commands from the PMECU 70. By so doing, the motor ECU 72 controls the first motor generator MG1 with the use of the first inverter 61, and controls the second motor generator MG2 with the use of the second inverter 62.

The engine ECU 73 is connected to the throttle valve actuator 22a, the fuel injection valves 23, the ignition devices 24, and the like, which serve as engine actuators, and transmits instruction signals to these actuators. Furthermore, the engine ECU 73 is connected to an air flow meter 91, a throttle valve opening degree sensor 92, a coolant temperature sensor 93, an engine rotation speed sensor 94, and the like, and acquires output signals generated by these sensors.

The air flow meter 91 measures the amount of air taken into the engine 20 per unit time, and outputs a signal that indicates the amount of air (intake air flow rate) Ga. The throttle valve opening degree sensor 92 detects the opening degree of the throttle valve 22 (throttle valve opening degree), and outputs a signal that indicates the detected throttle valve opening degree TA. The coolant temperature sensor 93 detects the temperature of coolant of the engine 20, and outputs a signal that indicates the detected coolant temperature THW. The coolant temperature THW is a parameter that strongly correlates with the temperature of the catalyst 27, and is also referred to as catalyst temperature parameter. The engine rotation speed sensor 94 generates a pulse signal each time the crankshaft 25 of the engine 20 rotates a predetermined angle. The engine ECU 73 acquires the engine rotation speed Ne on the basis of the pulse signal.

The engine ECU 73 controls the engine 20 by transmitting instruction signals to the throttle valve actuator 22a, the fuel injection valves 23 and the ignition device 24 (in addition, the variable intake valve timing control device (not shown)) on the basis of signals acquired from the above-described sensors, and the like, and commands from the PMECU 70. Note that the engine 20 is provided with a cam position sensor (not shown). The engine ECU 73 acquires a crank angle (absolute crank angle) of the engine 20 with reference to an intake top dead center of a specified cylinder on the basis of signals from the engine rotation speed sensor 94 and the cam position sensor.

Next, the outline of the operation of the hybrid vehicle 10 will be described. In the thus configured hybrid vehicle 10, when the PMECU 70 enters a system start-up state through operation of the power switch 81, the PMECU 70 determines whether it is required to perform catalyst warm-up operation and whether it is required to perform forced charging operation, and then performs catalyst warm-up operation and/or forced charging operation on the basis of the determination result.

The catalyst warm-up operation is a control for, when the coolant temperature THW that is the catalyst temperature parameter is lower than or equal to a predetermined temperature correlated threshold THWth (for example, a coolant temperature of 70° C.), quickly increasing the temperature of the catalyst 27 (catalyst bed temperature) to thereby rapidly activate the catalyst 27. More specifically, the PMECU 70 starts the engine 20 to cause the engine 20 to operate in an operating state appropriate for warm-up of the catalyst 27, and retards the ignition timing by a predetermined retardation amount with respect to the reference ignition timing. The "operating state appropriate for warm-up of the catalyst 27" is an operating state where a target engine rotation speed Ne* of the engine 20 is set to a rotation speed (for example, 1200 to 1300 rpm) slightly higher than a rotation speed during idle operation, a target engine generating torque Te* of the engine 20 is set to Tset substantially close to "0" (for example, several percent of an engine maximum torque when Ne=Ne*).

The reference ignition timing is an ignition timing that is predetermined such that the engine 20 is efficiently operated on the basis of a load of the engine 20 and an engine rotation speed Ne (that is, optimal ignition timing). The ignition timing is retarded from the reference ignition timing in the catalyst warm-up operation, and combustion becomes slow. Therefore, exhaust gas having high energy (that is high-temperature exhaust gas) is emitted from the engine 20. Thus, the temperature of the catalyst 27 quickly increases.

The retardation amount (catalyst warm-up retardation amount, reference retardation amount) of the ignition timing during the catalyst warm-up operation is determined on the basis of the load (actually, load factor (air filling factor) KL) of the engine 20 and the coolant temperature THW of the engine 20. The catalyst warm-up retardation amount is maximum when the coolant temperature THW is a predetermined temperature, and reduces as the coolant temperature THW is distanced from the predetermined temperature (that is, decreases in a range lower than the predetermined temperature or increases in a range higher than the predetermined temperature). Furthermore, the catalyst warm-up retardation amount is substantially "0" when the load factor KL is larger than or equal to a predetermined load threshold.

The forced charging operation is a control for, when the remaining level SOC of the battery 63 is lower than or equal to a predetermined remaining level correlated threshold SOCth (for example, about 30% to 35%), quickly increasing the remaining level SOC. More specifically, the PMECU 70 starts the engine 20, and operates the engine 20 such that the engine 20 generates a larger power (charging required power) as the remaining level SOC decreases.

In this case, the engine 20 is operated at an optimal engine operation point at which the efficiency is the highest in order to generate the charging required power. In other words, the target engine rotation speed Ne* of the engine 20 is set to the engine rotation speed Ne at the optimal engine operation point, and the target engine generating torque Te* is set to the engine generating torque Te at the optimal engine operation point. Note that the charging required power is about 5 to 6 kW at the maximum, and the engine rotation speed Ne at the optimal engine operation point in this case is about a minimum engine rotation speed (for example, 1000 rpm) at which it is possible to maintain the operation of the engine 20. As a result, the load of the engine 20 increases as the remaining level SOC decreases. In addition, the target engine generating torque Te* is small but is larger than "0", so torque generated by the engine 20 also acts on the ring gear 34. Thus, the second motor generator MG2 is controlled so as to generate torque that cancels the torque generated by the engine 20.

Furthermore, the first motor generator MG1 is subjected to rotation control such that the engine rotation speed Ne is kept at the target engine rotation speed Ne*. The first motor generator MG1 generates electric power by using force that restricts the engine rotation speed Ne to the target engine rotation speed Ne*. Thus, as the remaining level SOC decreases, the amount of electric power generated by the first motor generator MG1 increases. As a result, the battery 63 is quickly charged, so the remaining level SOC rapidly increases toward an appropriate value.

Incidentally, it has been found that, when the hybrid vehicle 10 enters a system start-up state, in the case where the coolant temperature THW is lower than or equal to a predetermined temperature correlated threshold THWth (that is, the catalyst warm-up operation is required) and the remaining level SOC is lower than or equal to a predetermined remaining level correlated threshold SOCth (that is, the forced charging operation is required), when the engine 20 is controlled in accordance with the forced charging operation and the ignition timing is retarded in order to facilitate warm-up of the catalyst 27, noise may occur from a power transmission mechanism formed of the power distribution mechanism 30 and the driving force transmission mechanism 50.

Figure 2:
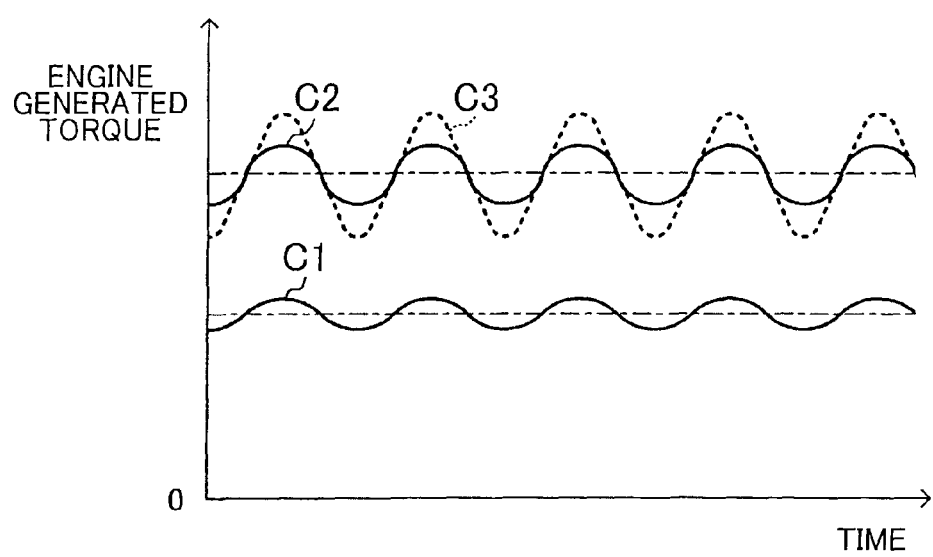
FIG. 2 is a graph that shows a state of fluctuations in output torque of an internal combustion engine during catalyst warm-up operation of the engine according to the embodiment.

This noise is "tooth hammer sound" that occurs due to a collision between gears of the power transmission mechanism. Hereinafter, the reason why the tooth hammer sound occurs will be described. When the ignition timing is retarded from the reference ignition timing, combustion becomes slow, so fluctuations in engine generating torque increase. In addition, for example, as indicated by a curve C1 and a curve C2 in FIG. 2, even when the retardation amount is the same, the engine generating torque fluctuates by a larger amount as the load of the engine (that is, the engine generating torque) increases. Furthermore, as indicated by a curve C3, the engine generating torque fluctuates by an extremely larger amount as the engine generating torque increases and the retardation amount of the ignition timing increases. Fluctuations in the engine generating torque propagate to the gears of the power transmission mechanism, so one of the gears in mesh with each other relatively moves toward or away from the other. As a result, tooth hammer sound occurs. As is understood from the above description, tooth hammer sound more easily occurs as the load of the engine increases and as the retardation amount of the ignition timing increases.

Then, in the hybrid vehicle 10 according to the present embodiment, when the catalyst warm-up operation is also executed in parallel during the forced charging operation of the engine 20, the retardation amount of the ignition timing during the catalyst warm-up operation is limited to a value lower than or equal to the retardation amount of the ignition timing during the catalyst warm-up operation when the forced charging operation is not being executed, and is set or corrected to a value that reduces as the load of the engine 20 increases. More specifically, the reference retardation amount that is the retardation amount of the ignition timing during normal catalyst warm-up operation is limited to a value that is smaller than or equal to a retardation amount limit value Amax that reduces as the load of the engine 20 increases. As a result, it is possible to facilitate warm-up of the catalyst 27 while large tooth hammer sound is not generated during the forced charging operation.

Next, the actual operation of the hybrid vehicle 10 will be described. Note that the process described below is executed by the CPU of the engine ECU 73 and the CPU of the PMECU 70. However, in the following description, for the sake of simple description, the CPU of the engine ECU 73 is referred to as "EG", and the CPU of the PMECU 70 is referred to as "PM".

Figure 3:
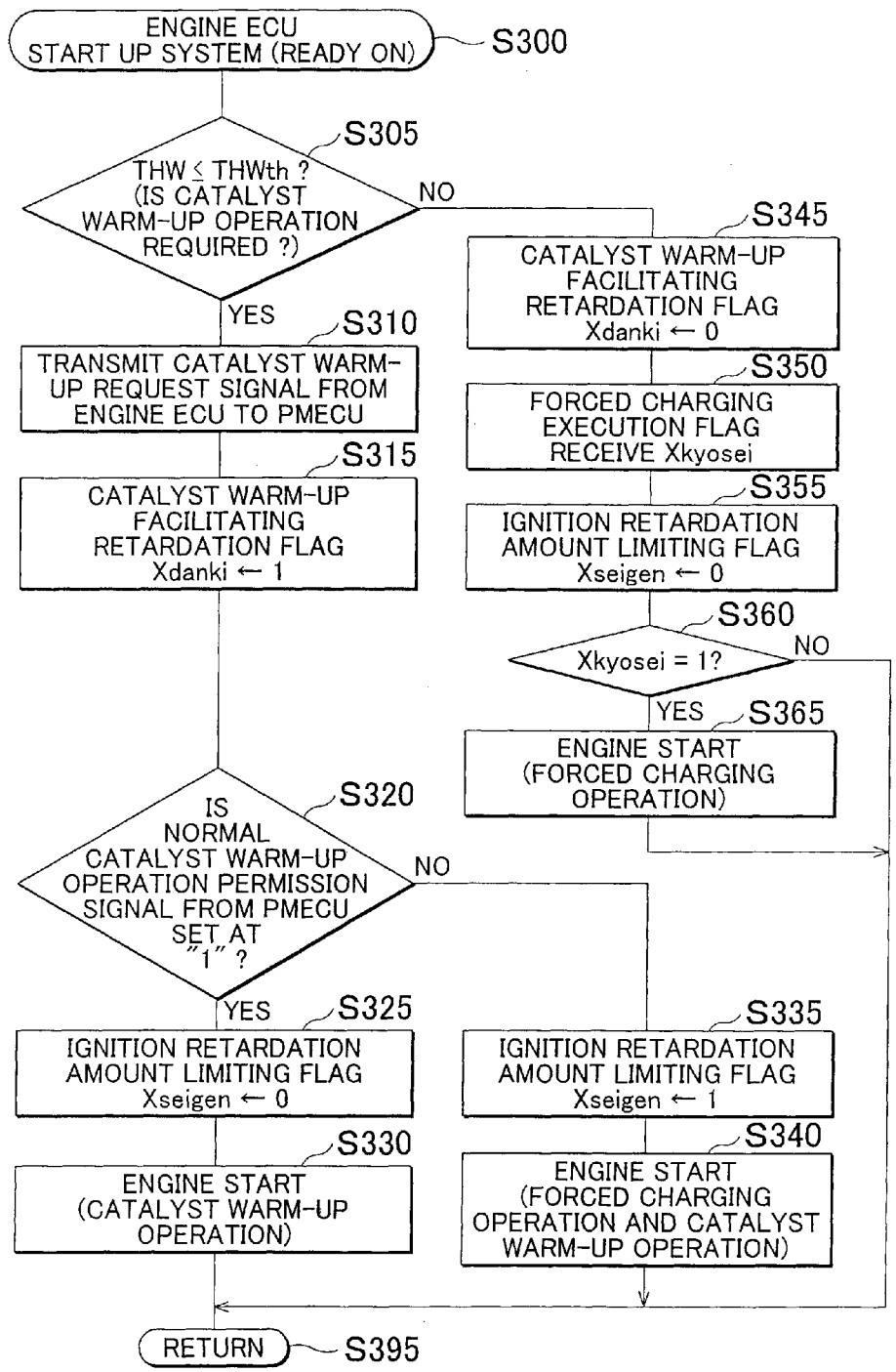
FIG. 3 is a flowchart that shows a routine executed by a CPU of an engine ECU shown in FIG. 1 at the time of a system start-up.

The EG executes a system start-up process routine shown by the flowchart in FIG. 3 at the time of a system start-up (ready-on). Thus, when the power switch 81 is operated and the system starts up, the EG starts the process from step 300 in FIG. 3 and proceeds with the process to step 305, and determines whether the coolant temperature THW is lower than or equal to the predetermined temperature correlated threshold THWth. That is, the EG determines in step 305 whether the catalyst warm-up operation is required.

First, case 1 in which the forced charging operation is not required will be described. Now, it is assumed that the catalyst warm-up operation is required because the coolant temperature THW is lower than or equal to the predetermined temperature correlated threshold THWth, and the forced charging operation is not required because the remaining level SOC is higher than the predetermined remaining level correlated threshold SOCth.

In this case, the EG makes affirmative determination in step 305 and then proceeds with the process to step 310, and transmits a catalyst warm-up request signal from the engine ECU 73 to the PMECU 70. Subsequently, the CPU proceeds with the process to step 315, and sets the value of a catalyst warm-up facilitating retardation flag Xdanki at "1". The value of the catalyst warm-up facilitating retardation flag Xdanki is set at "0" by the EG through an initial routine (not shown) executed immediately after a system start-up. Subsequently, the EG proceeds with the process to step 320, and determines whether a normal catalyst warm-up operation permission signal transmitted from the PMECU 70 is "1".

Figure 4:
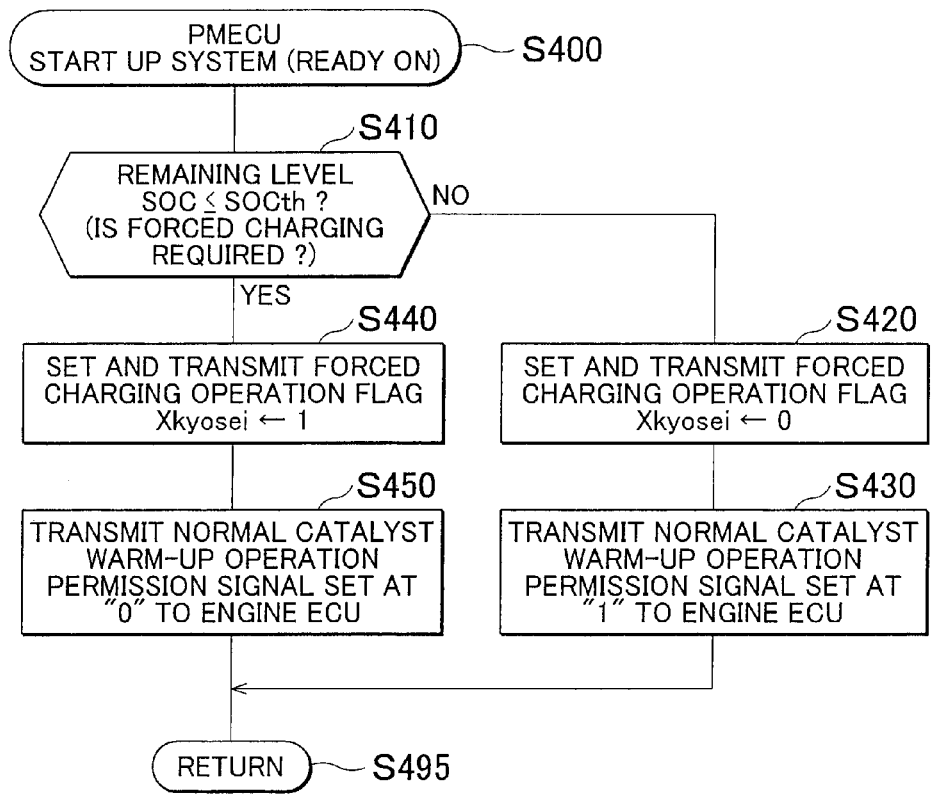
FIG. 4 is a flowchart that shows a routine executed by a CPU of a power management ECU shown in FIG. 1 at the time of a system start-up.

On the other hand, the PM executes a system start-up process routine shown by the flowchart in FIG. 4 at the time of a system start-up (ready-on). Thus, when the system starts up, the PM starts the process from step 400 of FIG. 4 and proceeds with the process to step 410, and determines whether the remaining level SOC of the battery 63 is lower than or equal to the predetermined remaining level correlated threshold SOCth. That is, the PM determines in step 410 whether the forced charging operation is required.

According to the above-described assumption, because the remaining level SOC is higher than the predetermined remaining level correlated threshold SOCth, the forced charging operation is not required. Thus, the PM makes negative determination in step 410 and then proceeds with the process to step 420, sets the value of a forced charging execution flag Xkyosei at "0", and transmits the value of forced charging execution flag Xkyosei to the engine ECU 73. Note that the value of the forced charging execution flag Xkyosei is set at "0" by the PM through an initial routine (not shown) executed immediately after a system start-up. Subsequently, the PM sets the value of the normal catalyst warm-up operation permission signal at "1" and transmits the normal catalyst warm-up operation permission signal to the engine ECU 73 in step 430. After that, the PM proceeds with the process to step 495, and once ends the routine shown in FIG. 4.

When the EG receives the normal catalyst warm-up operation permission signal, the EG determines in step 320 of FIG. 3 whether the value of the normal catalyst warm-up operation permission signal is "1". In this case, the value of the normal catalyst warm-up operation permission signal is "1", so the EG makes affirmative determination in step 320 and then proceeds with the process to step 325, and sets the value of an ignition retardation amount limiting flag Xseigen at. "0". Subsequently, the EG proceeds with the process to step 330, starts the engine 20 to start the catalyst warm-up operation. At this time, the PM also controls the first motor generator MG1 and the second motor generator MG2 in accordance with the catalyst warm-up operation.

That is, the EG sets the target engine rotation speed Ne* at Nset (for example, 1300 rpm) appropriate for the catalyst warm-up operation, and sets the target engine generating torque Te* at the engine generating torque Tset (that is, substantially "0") in the case where the engine 20 autonomously operates.

Figure 5A:
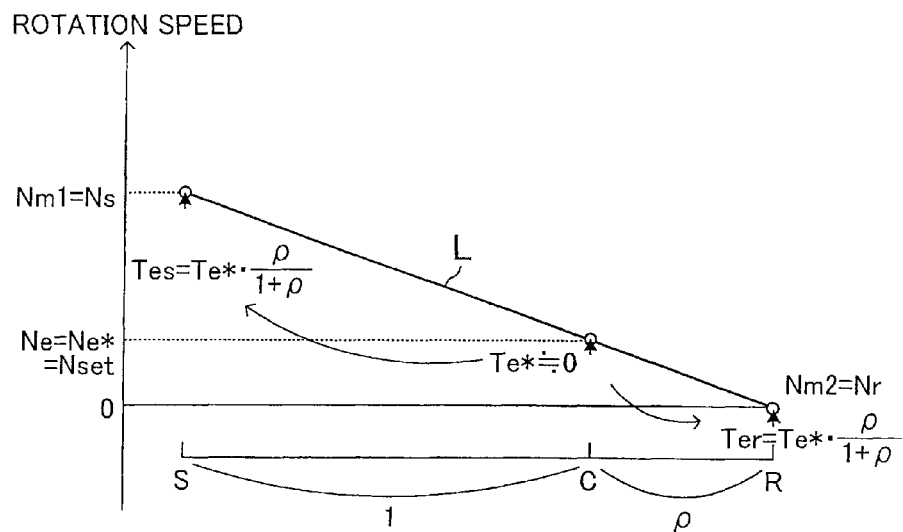
FIG. 5A is a nomograph of a planetary gear unit during catalyst warm-up operation of the internal combustion engine.

Incidentally, the relationship among rotation speeds of the gears in the planetary gear unit 31 in this case is shown by a known nomograph shown in FIG. 5A. The line shown in the nomograph is referred to as an operation collinear L. According to this, it is possible to obtain the rotation speed Ns of the sun gear 32 by the following mathematical expression (1). In the mathematical expression (1), "ρ" is the number of teeth of the sun gear 32 with respect to the number of teeth of the ring gear 34 (ρ=the number of teeth of the sun gear 32/the number of teeth of the ring gear 34). Note that, as is understood from the operation collinear L, the mathematical expression (1) is derived on the basis of a proportional relationship that the ratio (=(Ne−Nr)/(Ns−Nr)) of the difference (Ne−Nr) between the engine rotation speed Ne and the rotation speed Nr of the ring gear 34 with respect to the difference (Ns−Nr) between the rotation speed Ns of the sun gear 32 and the rotation speed Nr, of the ring gear 34 is equal to the ratio (=ρ/(1+ρ)) of ρ with respect to a value (1+ρ).

$$Ns=Nr-(Nr-Ne)\times(1+\rho)/\rho \qquad (1)$$

Thus, by substituting an actual rotation speed Nr of the ring gear 34, that is, "0" and the target engine rotation speed Ne* into the above-described mathematical expression (1), it is possible to calculate a target rotation speed Ns* of the sun gear 32. When the sun gear 32 rotates at the target rotation speed Ns*, the engine rotation speed Ne coincides with the target engine rotation speed Ne*. The rotation speed Ns of the sun gear 32 is equal to the rotation speed Nm1 of the first motor generator MG1. Then, during the catalyst warm-up operation in step 330, the PM sets an MG1 target rotation speed Nm1* that is a target value of the rotation speed Nm1 of the first motor generator MG1 at Ne*(1+ρ)/ρ, and controls the first motor generator MG1 such that the first motor generator MG 1 rotates at the MG 1 target rotation speed $Nm1^* = Ne^*(1+\rho)/\rho$. Note that the target engine generating torque Te* is Tset that is substantially "0", so the balance of force of the operation collinear L is kept even when the first motor generator MG 1 and the second motor generator MG2 do not generate torque. Then, the EG controls the throttle valve actuator 22a such that the engine generating torque Te becomes the value Tset, and causes the fuel injection valves 23 to inject fuel injection amounts corresponding to the intake air amount Ga that varies in accordance with the control over the throttle valve actuator 22a.

Furthermore, the EG executes the ignition timing control routine shown by the flowchart in FIG. 6 during operation of the engine 20 each time a predetermined period of time elapses. Thus, at a predetermined timing, the EG starts the process from step 600 of FIG. 6 and proceeds with the process to step 605, and calculates a basic ignition timing Ab by applying an actual load KL and an actual engine rotation speed Ne to a table MapAb(KL, Ne) that defines the correlation among a load KL of the engine 20, an engine rotation speed Ne and a basic ignition timing (reference ignition timing, optimal ignition timing) Ab. Note that the load KL is obtained from $KL = (Mc/(\rho air \times L/4)) \times 100\%$. Mc denotes an intake air flow rate Ga and is an in-cylinder intake air amount (unit: g) per one cylinder and one intake stroke, calculated on the basis of the throttle valve opening degree TA, the engine rotation speed Ne, and the like, ρair is an air density (unit: g/l), L is a displacement (unit: l) of the engine 20, and "4" is the number of cylinders of the engine 20. In addition, in the specification, the ignition timing is defined so as to be positive and increase in absolute value as the ignition timing advances from a compression top dead center.

Subsequently, the EG proceeds with the process to step 610, and determines whether the value of the catalyst warm-up facilitating retardation flag Xdanki is "1". At present, the value of the catalyst warm-up facilitating retardation flag Xdanki is set at "1" in step 315 of FIG. 3, so the EG makes affirmative determination in step 610, proceeds with the process to step 615, and calculates and determines the catalyst warm-up retardation amount Adanki on the basis of the load KL and the coolant temperature THW. The catalyst warm-up retardation amount Adanki obtained in step 610 is also referred to as "reference retardation amount" for the sake of convenience.

More specifically, the EG calculates the catalyst warm-up retardation amount Adanki by applying an actual load KL and an actual coolant temperature THW to a table MapAdanki (KL, THW) that defines the correlation among a load KL of the engine 20, a coolant temperature THW and a catalyst warm-up retardation amount Adanki.

According to the table MapAdanki(KL, THW), the catalyst warm-up retardation amount Adanki is maximum when the coolant temperature THW is a predetermined temperature (for example, a coolant temperature of 25° C.), and is acquired as a value that reduces as the coolant temperature THW is distanced from the predetermined temperature. Furthermore, according to the table MapAdanki(KL, THW), the load KL is set at "0" when the operation of the engine 20 is required while the vehicle 10 is travelling and the load of the engine 20 is larger than or equal to a predetermined load in that case. That is, when the load of the engine 20 is larger than or equal to the predetermined load while the vehicle 10 is travelling, retardation of the ignition timing for facilitating warm-up of the catalyst is not performed.

Subsequently, the EG proceeds with the process to step 620, and determines an additional retardation amount Ata of the ignition timing. For example, the additional retardation amount Ata is a correction amount that varies as the intake air amount Ga increases or reduces. Subsequently, the EG proceeds with the process to step 625, and calculates an ignition retardation amount Artd by adding the catalyst warm-up retardation amount Adanki to the additional retardation amount Ata.

Subsequently, the EG proceeds with the process to step 630, and determines whether the value of the ignition retardation amount limiting flag Xseigen is "1". In this case, in step 325 of FIG. 3, the value of the ignition retardation amount limiting flag Xseigen is set at "0". Thus, the EG makes negative determination in step 630 and directly proceeds with the process to step 650, and calculates a final ignition timing Aope by subtracting the ignition retardation amount Artd calculated in step 625 from the basic ignition timing Ab calculated in step 605. Then, the EG carries out ignition at the final ignition timing Aope. Thus, the catalyst warm-up operation is executed without limiting the retardation amount of the ignition timing. In this case, the load KL of the engine 20 is small (in other words, the output torque of the engine 20 is small), so torque fluctuations of the engine 20 are small. Thus, large tooth hammer sound does not occur.

Next, case 2 in which the forced charging operation is required will be described. Next, description will be made on the case where, at the time of a system start-up, the catalyst warm-up operation is required because the coolant temperature THW is lower than or equal to the predetermined temperature correlated threshold THWth, and the forced charging operation is also required because the remaining level SOC is lower than the predetermined remaining level correlated threshold SOCth.

In this case, the PM makes affirmative determination in step 410 of FIG. 4 and proceeds with the process to step 440, sets the value of the forced charging execution flag Xkyosei at "1", and transmits the value of the forced charging execution flag Xkyosei to the engine ECU 73. Furthermore, in step 450, the PM sets the value of the normal catalyst warm-up operation permission signal at "0", and transmits the value of the normal catalyst warm-up operation permission signal to the engine ECU 73. After that, the PM proceeds with the process to step 495, and once ends the routine shown in FIG. 4.

Thus, when the EG proceeds with the process to step 320 via step 305 to step 315 of FIG. 3, the EG makes negative determination in step 320 and proceeds with the process to step 335. Then, in step 335, the EG sets the value of the ignition retardation amount limiting flag Xseigen at "1". Subsequently, the EG proceeds with the process to step 340, and starts the engine 20 to start the forced charging operation with catalyst warm-up control.

In this case, the PM sets an engine required power (charging required power) Pe* such that the engine required power Pe* increases as the remaining level SOC decreases. Furthermore, the PM determines an optimal engine operation point at which the engine required power Pe* is satisfied, and sets the engine generating torque Te and the engine rotation speed Ne at the optimal engine operation point for the target engine generating torque Te* and the target engine rotation speed Ne*, respectively. Note that the engine required power Pe* in this case is about 5 to 6 kw at the maximum, so, generally, the engine rotation speed at the optimal engine operation point is a rotation speed (for example, about 1000 rpm) near a minimum rotation speed at which the engine 20 can be operated. As a result, the load KL required for the internal combustion engine 20 increases as the remaining level SOC decreases.

Figure 5B:
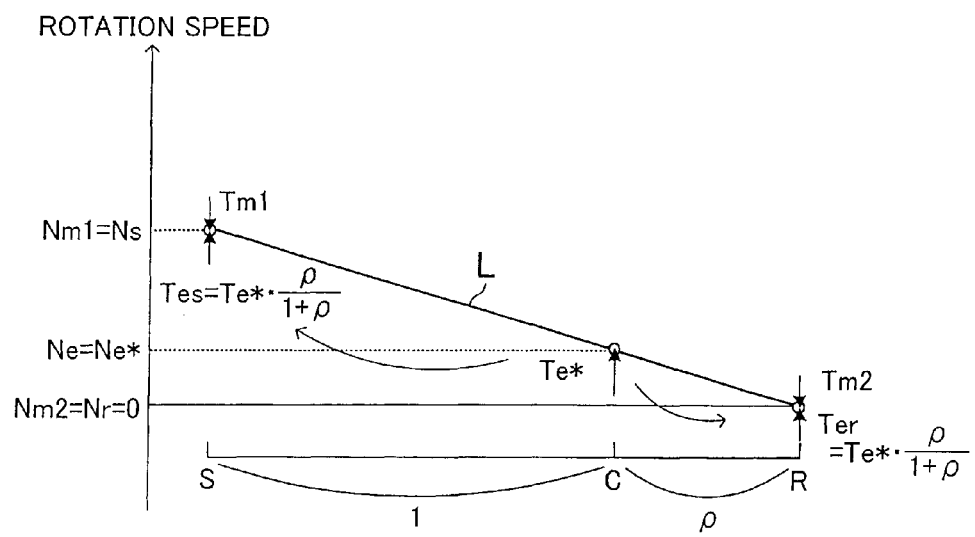
FIG. 5B is a nomograph of the planetary gear unit during forced charging operation of the internal combustion engine.

The relationship among the rotation speeds of the gears in the planetary gear unit 31 in this case is shown by the nomograph shown in FIG. 5B. In this case, the target engine generating torque Te* is relatively large, so the engine generating torque Te acts on a rotary shaft of the sun gear 32 as a torque Tes expressed by the following mathematical expression (2), and acts on a rotary shaft of the ring gear 34 as a torque Ter expressed by the following mathematical expression (3).

$$Tes=Te^{*}\times(\rho/(1+\rho)) \qquad (2)$$

$$Ter=Te^{*}\times(1/(1+\rho)) \qquad (3)$$

Therefore, the PM causes a torque Tm1 having the same magnitude as the torque Tes and an opposite direction from the direction of the torque Tes obtained from the above-described mathematical expression (2) to act on the rotary shaft of the sun gear 32, and causes a torque Tm2 having the same magnitude as the torque Ter and an opposite direction from the direction of the torque Ter obtained from the above-described mathematical expression (3) to act on the rotary shaft of the ring gear 34. By so doing, the rotation speed of the ring gear 34 is kept at "0". Furthermore, in order to bring the engine rotation speed Ne into coincidence with the target engine rotation speed Ne*, the PM sets the MG1 target rotation speed Nm1* that is a target value of the rotation speed Nm1 of the first motor generator MG1 at Ne*(1+ρ)/ρ obtained from the above-described mathematical expression (1), obtains a torque that is obtained by adding a feedback amount PID(Nm1*−Nm1) corresponding to the difference between the MG1 target rotation speed Nm1* and the rotation speed Nm1 of the first motor generator MG1 to the torque Tm1, and then causes the first motor generator MG1 to generate that torque. As a result, the first motor generator MG1 generates electric power based on the engine required power (charging required power) Pe* (that is, the remaining level SOC), so the battery 63 is rapidly charged.

Furthermore, the EG starts the process from step 600 of FIG. 6, proceeds with the process to step 605, and calculates the basic ignition timing Ab. At present, the value of the catalyst warm-up facilitating retardation flag Xdanki is set at "1" in step 315 of FIG. 3, so the EG makes affirmative determination in step 610 and proceeds with the process to step 615, and determines the catalyst warm-up retardation amount (reference retardation amount) Adanki on the basis of the load KL and the engine rotation speed Ne.

Subsequently, the EG calculates the additional retardation amount Ata and the ignition retardation amount Artd in step 620 and step 625. At present, in step 335 of FIG. 3, the value of the ignition retardation amount limiting flag Xseigen is set at "1". Thus, the EG makes affirmative determination in step 630, and proceeds with the process to step 635. In step 635, the EG calculates the retardation amount limit value (retardation upper limit) Amax of the ignition timing on the basis of the load KL and the coolant temperature THW.

Figure 7:
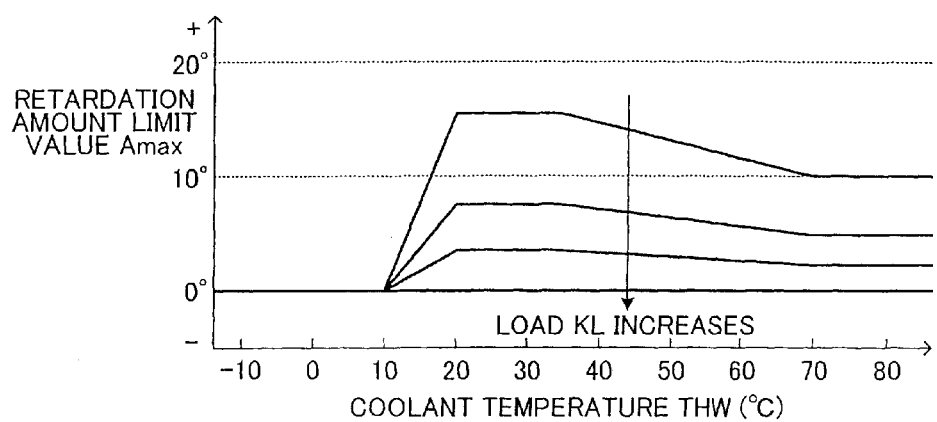
FIG. 7 is a look-up table of a retardation amount limit value, consulted by the CPU of the engine ECU shown in FIG. 1.

More specifically, the EG stores the table MapAmax(KL, THW) that defines the correlation among a load KL, a coolant temperature THW and a retardation amount limit value Amax, shown in FIG. 7, in the ROM. The EG acquires the retardation amount limit value Amax by applying an actual load KL and an actual coolant temperature THW to the table MapAmax(KL, THW). The retardation amount limit value Amax is a value smaller than or equal to the maximum of the catalyst warm-up retardation amount Adanki that is the reference retardation amount, determined in the above-described step 615. In other words, the retardation amount limit value Amax is a value smaller than or equal to the catalyst warm-up retardation amount Adanki that is the reference retardation amount, determined in the above-described step 615 in the case where the load KL and the coolant temperature THW are the same.

According to the table MapAmax(KL, THW), the retardation amount limit value Amax is acquired such that the retardation amount limit value Amax (the absolute value of the retardation amount limit value Amax) reduces as the load KL increases. Furthermore, according to the table MapAmax (KL, THW), the retardation amount limit value Amax is acquired such that the retardation amount limit value Amax is maximum when the coolant temperature THW falls within a predetermined range (for example, 20° C. to 35° C.) and the retardation amount limit value Amax gradually reduces as the coolant temperature THW exceeds the predetermined range and increases. Furthermore, according to the table MapAmax (KL, THW), the retardation amount limit value Amax is acquired such that the retardation amount limit value Amax steeply reduces as the coolant temperature THW decreases within a range lower than or equal to a lower limit of the predetermined range and the retardation amount limit value Amax becomes a minimum value (in this case, "0") when the coolant temperature THW is lower than or equal to a predetermined coolant temperature THWLo.

Subsequently, the EG proceeds with the process to step 640, and determines whether the ignition retardation amount Artd obtained in step 625 is larger than or equal to the retardation amount limit value Amax obtained in step 635. Then, when the ignition retardation amount Artd is larger than or equal to the retardation amount limit value Amax, the EG makes affirmative determination in step 640 and proceeds with the process to step 645, and sets the retardation amount limit value Amax for the ignition retardation amount Artd. After that, the EG proceeds with the process to step 650. In contrast to this, when the ignition retardation amount Artd is smaller than the retardation amount limit value Amax, the EG makes negative determination in step 640, and directly proceeds with the process to step 650.

That is, through the processes of step 640 and step 645, the ignition retardation amount Artd is limited by the retardation amount limit value Amax. In other words, the ignition retardation amount Artd is corrected so as to be smaller than or equal to the retardation amount limit value Amax. As described above, the retardation amount limit value Amax reduces as the load KL of the engine 20 increases. Thus, it may be understood that the retardation amount of the ignition timing during the catalyst warm-up operation is corrected (limited) so as to reduce as the load KL increases. By so doing, when warm-up of the catalyst 27 is facilitated by retarding the ignition timing during the forced charging operation, it is possible to reduce fluctuations of the engine generating torque even when the engine required power (charging required power) increases and, as a result, the load of the engine 20 increases, so it is possible to avoid a situation that large tooth hammer sound occurs.

Next, description will be made on case 3 where, at the time of a system start-up, the catalyst warm-up operation is not required because the coolant temperature THW is higher than the predetermined temperature correlated threshold THWth, and the forced charging operation is required because the remaining level SOC is lower than the predetermined remaining level correlated threshold SOCth.

In this case, in step 440 of FIG. 4, the Value of the forced charging execution flag Xkyosei is set at "1" and is transmitted to the engine ECU 73, and the normal catalyst warm-up operation permission signal set at "0" in step 450 is transmitted to the engine ECU 73.

On the other hand, the EG makes negative determination in step 305 of FIG. 3, sets the value of the catalyst warm-up facilitating retardation flag Xdanki at "0" in step 345, acquires the forced charging execution flag Xkyosei in step 350, and sets the value of the ignition retardation amount limiting flag Xseigen at "0" in step 355. Subsequently, the EG determines in step 360 whether the value of the forced charging execution flag Xkyosei is "1". In this case, the value of the forced charging execution flag Xkyosei is "1". Thus, the EG makes affirmative determination in step 360 and proceeds with the process to step 365, and starts the engine 20 to start the forced charging operation. The forced charging operation is basically similar to the operation executed in step 340 except that the ignition timing is not retarded using the catalyst warm-up retardation amount Adanki. After that, the CPU proceeds with the process to step 395, and once ends the routine.

In this case as well, the EG starts the process from step 600 of FIG. 6 and proceeds with the process to step 605, and calculates the basic ignition timing Ab. At present, the value of the catalyst warm-up facilitating retardation flag Xdanki is set at "0" in step 345 of FIG. 3, so the EG makes negative determination in step 610 and proceeds with the process to step 660, and sets the catalyst warm-up retardation amount Adanki at "0".

Subsequently, the EG calculates the additional retardation amount Ata in step 620 and the ignition retardation amount Artd in step 625. At this time, the value of the ignition retardation amount limiting flag Xseigen is set at "0" in step 355. Thus, the EG makes negative determination in step 630 and directly proceeds with the process to step 650. As a result, the catalyst warm-up retardation amount Adanki is "0"; however, when the additional retardation amount Ata is not "0", the ignition timing is retarded from the basic ignition timing Ab by the additional retardation amount Ata. In this case, the additional retardation amount Ata is not so large as the catalyst warm-up retardation amount Adanki, so large tooth hammer sound does not occur.

Finally, description will be made on case 4 where, at the time of a system start-up, the catalyst warm-up operation is not required because the coolant temperature THW is higher than the predetermined temperature correlated threshold THWth and the forced charging operation is also not required because the remaining level SOC is higher than the predetermined remaining level correlated threshold SOCth.

In this case, in step 420 of FIG. 4, the value of the forced charging execution flag Xkyosei is set at "0" and is transmitted to the engine ECU 73, and the normal catalyst warm-up operation permission signal set at "1" in step 430 is transmitted to the engine ECU 73.

On the other hand, the EG makes negative determination in step 305 of FIG. 3, and proceeds with the process to step 360 after the processes of step 345 to step 355. In this case, the value of the forced charging execution flag Xkyosei is set at "0". Thus, the EG makes negative determination in step 360 and directly proceeds with the process to step 395. As a result, the engine 20 is not started.

Figure 8:
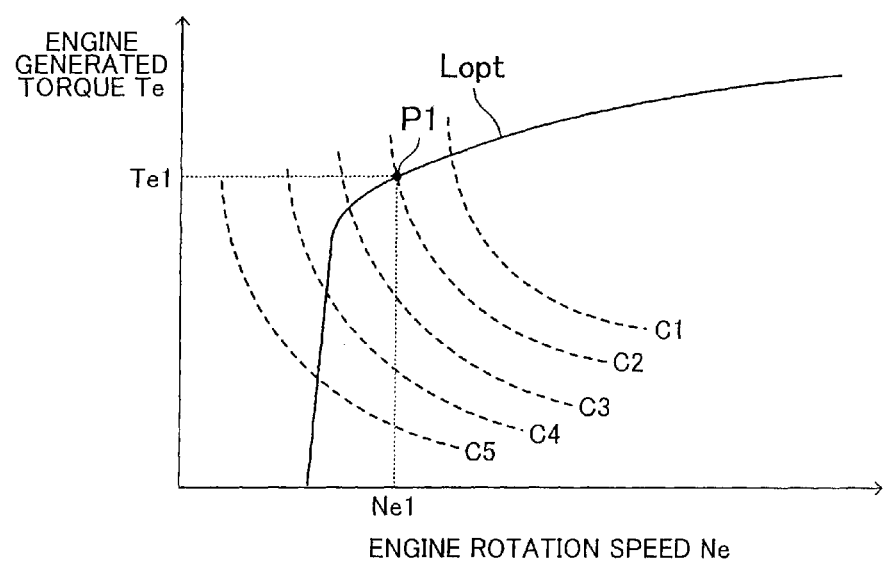
FIG. 8 is a graph that shows an optimal engine operation line of the internal combustion engine shown in FIG. 1.
Figure 9:
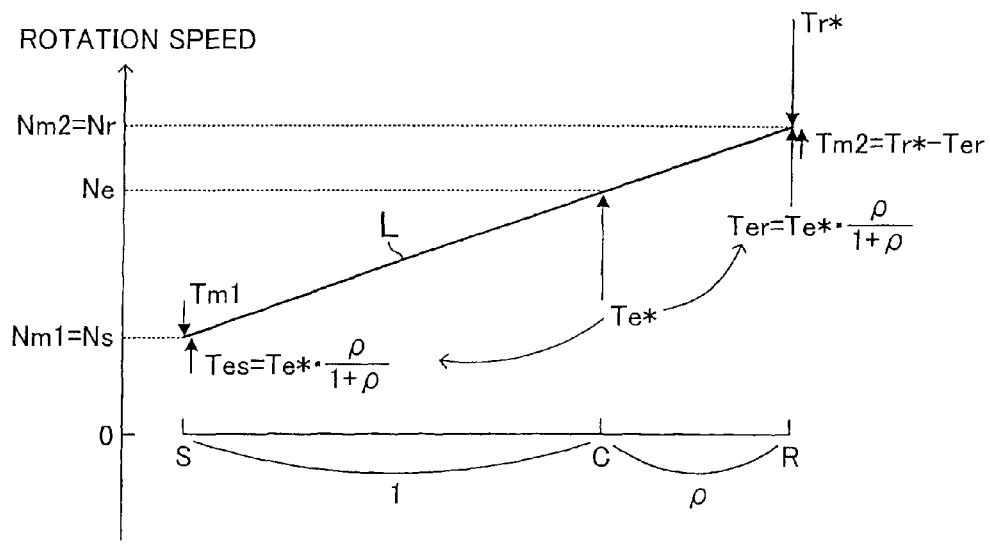
FIG. 9 is a nomograph of the planetary gear unit shown in FIG. 1 during normal travel of the vehicle.

Next, drive controls over the first motor generator MG1, the second motor generator MG2 and the engine 20 during normal travel of the hybrid vehicle 10 will be simply described with reference to FIG. 8 and FIG. 9. Note that the details of these drive controls are, for example, described in Japanese Patent Application Publication No. 2009-126450 (JP 2009-126450 A) (US 2010/0241297 A), Japanese Patent Application Publication No. 9-308012 (JP 9-308012 A) (U.S. Pat. No. 6,131,680 filed on Mar. 10, 1997), and the like. These are incorporated into the specification of the present application by reference.

When the shift position is the driving position, and the like, the PM determines a torque to be generated by the rotary shaft of the ring gear 34 (hereinafter, simply referred to as "ring gear required torque Tr*") corresponding to a user required torque Treq that is a torque required to rotate the drive shaft 53 of the vehicle 10 on the basis of the accelerator operation amount AP and the vehicle speed SPD. The ring gear required torque Tr* is set so as to increase as the accelerator operation amount AP increases and to reduce as the vehicle speed SPD increases.

The power required for the drive shaft 53 is a value that is directly proportional to the product (Treq·SPD) of the user required torque Treq and the actual vehicle speed SPD, and the value is equal to the product (Tr*·Nr) of the ring gear required torque Tr* and the rotation speed Nr of the ring gear 34. Hereinafter, the product Tr*·Nr is referred to as "user required power (required power) Pr*". Note that, in the present embodiment, the ring gear 34 is connected to the second shaft 42 of the second motor generator MG2 without intervening a speed reducer. Thus, the rotation speed Nr of the ring gear 34 is equal to the MG2 rotation speed Nm2. If the ring gear 34 is connected to the second shaft 42 via a speed reduction gear, the rotation speed Nr of the ring gear 34 is equal to a value (Nm2/Gr) obtained by dividing the MG2 rotation speed Nm2 by the gear ratio Gr of the speed reduction gear.

As shown in the following mathematical expression (4), the PM determines the sum of the user required power Pr* and a power (battery charging power) Pb* required to charge the battery 63 (furthermore, actually a value added with a loss Ploss) as the power (engine required power) Pe* required for the engine 20. The battery charging power Pb* increases as the remaining level SOC decreases, and becomes "0" when the remaining level is higher than or equal to a predetermined value (for example, 60%).

$$Pe^* = Pr^* + Pb^* + Ploss \qquad (4)$$

Then, the PM operates the engine 20 such that a power equal to the engine required power Pe* is output from the engine 20 and the operation efficiency of the engine 20 is the highest. More specifically, an engine operation point at which the operation efficiency (fuel economy) of the engine is the highest when a power is output from the crankshaft 25 is obtained in advance as an optimal engine operation point for each power through an experiment, or the like. A line formed by connecting these optimal engine operation points plotted on a graph defined by the engine generating torque Te and the engine rotation speed Ne is obtained as an optimal engine operation line. The thus obtained optimal engine operation line is indicated by the solid line Lopt in FIG. 8. Note that, in FIG. 8, each of a plurality of lines C1 to C5 indicated by the broken lines is a line (constant power line) that connects engine operation points at which it is possible to output the same power from the crankshaft 25.

The PM searches for the optimal engine operation point at which it is possible to obtain a power equal to the engine required power Pe*, and determines the engine generating torque Te and the engine rotation speed Ne corresponding to the searched optimal operation point as the target engine generating torque Te* and the target engine rotation speed Ne*, respectively. For example, when the engine required power Pe* is equal to a power corresponding to the line C2 in FIG. 8, an engine generating torque Te1 at an intersection P1 of the line C2 and the solid line Lopt is determined as the target engine generating torque Te*, and an engine rotation speed Ne at the intersection P1 is determined as the target engine rotation speed Ne*.

Then, the PM determines the target rotation speed Ns* of the sun gear 32, that is, the MG1 target rotation speed Nm1*, by substituting the MG2 rotation speed Nm2, equal to the actual rotation speed Nr of the ring gear 34, and the target engine rotation speed Ne* into the above-described mathematical expression (1). When the sun gear 32 rotates at the target rotation speed Ns*=Nm1*, the engine rotation speed Ne coincides with the target engine rotation speed Ne*.

Furthermore, when a torque equal to the target engine generating torque Te* is generated at the crankshaft 25 (that is, the engine generating torque is Te*), the engine generating torque Te* is converted by the planetary gear unit 31 into the torque Tes that is expressed by the above-described mathematical expression (2) and that acts on the rotary shaft of the sun gear 32 and the torque Ter that is expressed by the above-described mathematical expression (3) and that acts on the rotary shaft of the ring gear 34.

The balance of force of the operation collinear just needs to be kept in order to stabilize the operation collinear, so the torque Tm1 having the same magnitude as the torque Tes and an opposite direction from the direction of the torque Tes, obtained from the above-described mathematical expression (2), just needs to be caused to act on the rotary shaft of the sun gear 32, and the torque Tm2 (torque Tm2 expressed by the following mathematical expression (5)) corresponding to an insufficient amount of the torque Ter, obtained from the above-described mathematical expression (3), with respect to the ring gear required torque Tr* just needs to be caused to act on the rotary shaft of the ring gear 34.

$$Tm2 = Tr^* - Ter \qquad (5)$$

The PM employs the above-described torque Tm1 as an MG1 command torque Tm1* of the first motor generator MG1, and employs the above-described torque Tm2 as an MG2 command torque Tm2* that is a command torque of the second motor generator MG2. Furthermore, the PM adds a feedback amount PID(Nm1*−Nm1) corresponding to the difference between "the MG1 target rotation speed Nm1*=the target rotation speed Ns* of the sun gear 32" and "the actual rotation speed Ns of the sun gear 32=the rotation speed Nm1 of the first motor generator MG1" to the above-described MG1 command torque Tm1*, and uses the value as the MG1 command torque Tm1* that is a final command torque of the first motor generator MG1. Then, the PM controls the first inverter 61 and the second inverter 62 on the basis of these command values to control the first motor generator MG1 and the second motor generator MG2, and controls the engine 20 such that the engine generating torque of the engine 20 coincides with the target engine generating torque Te*.

Note that, when the battery charging power Pb* is a positive value, the torque Ter relatively increases with the battery charging power Pb*. Thus, as is understood from the above-described mathematical expression (5), the torque Tm2 may be small, so the MG2 command torque Tm2* is also small. As a result, the amount of electric power required to be supplied to the second motor generator MG2 within electric power generated by the first motor generator MG1 reduces, so the battery 63 is charged by that much.

Note that, for example, when the required power Pr* is smaller than a predetermined power Prth, for example, at the time of a start of the vehicle, during steady operation at a relatively low speed, or during gentle acceleration from a relatively low speed and, therefore, the engine 20 is not allowed to be operated at the optimal engine operation point, the PM does not operate the engine 20 except during the catalyst warm-up operation and controls the second motor generator MG2 such that the entire user required power Pr* is generated from the second motor generator MG2. In addition, even when the engine 20 is allowed to be operated at the optimal engine operation point, at the time when the target engine generating torque Te* changes with a change of the ring gear required torque Tr*, the operating state of the engine 20 does not immediately change, so the engine generating torque may be smaller than the target engine generating torque Te*. In such a case, the PMECU 80 controls the second motor generator MG2 such that the amount of insufficient torque with respect to the ring gear required torque Tr* is compensated until the engine 20 is operated at the optimal operation point.

In this way, the hybrid vehicle 10 generates the torque required to rotate the drive shaft 53 by controlling the torque generated by the internal combustion engine 20, the torque generated by the second motor generator MG2 that serves as an electric motor and the torque generated by the first motor generator MG1 that serves as a generator. Furthermore, the hybrid vehicle 10 controls electric power generated by the first motor generator MG1 that serves as a generator by adjusting or controlling power generated by the internal combustion engine 20 (the power of the engine 20, see the above-described torque Tes).

Note that, when the engine 20 is started for the catalyst warm-up operation at the time of a system start-up, the operation of the engine is continued while the hybrid vehicle 10 is travelling as well, and, when the coolant temperature THW has reached the predetermined temperature correlated threshold THWth or a predetermined value above the predetermined temperature correlated threshold THWth, the operation of the engine 20 for the catalyst warm-up operation is stopped. In addition, when the forced charging control is started at the time of a system start-up, the battery 63 is charged on the basis of the above-described battery charging power Pb* while the hybrid vehicle 10 is travelling, and, after that, when the remaining level SOC is lower than or equal to the remaining level correlated threshold SOCth at the time when the shift position is changed to the parking position (and/or the neutral position), the above-described forced charging control is continued.

As described above, the hybrid vehicle 10 according to the embodiment of the invention includes a control device that includes a catalyst warm-up operation execution device and a forced charging operation execution device (see the PMECU 70, the battery ECU 71, the motor ECU 72 and the engine ECU 73).

The catalyst warm-up operation execution device starts the internal combustion engine 20 when the catalyst temperature parameter (coolant temperature THW) that is a parameter that correlates with the temperature of the catalyst 27 is lower than or equal to the predetermined temperature correlated threshold (THWth), and executes the catalyst warm-up operation for retarding the ignition timing of the internal combustion engine 20 by the predetermined retardation amount (Adanki or Artd) with respect to the reference ignition timing (Ab) (see step 330 and step 340 in FIG. 3, and step 615 to step 625 and step 650 in FIG. 6, and the like).

The forced charging operation execution device executes the forced charging operation for charging the electrical storage device by starting the internal combustion engine 20 to cause the generator (first motor generator MG1) to generate electric power when the remaining level parameter (remaining level SOC) that is a parameter that correlates with the remaining level of the electrical storage device (battery 63) is lower than or equal to the predetermined remaining level correlated threshold (SOCth) (see step 340 and step 365 in FIG. 3, and the like).

Furthermore, the forced charging operation execution device is configured to operate the internal combustion engine by changing the load required for the internal combustion engine 20 on the basis of the remaining level parameter (remaining level SOC) (see step 340 and step 365 in FIG. 3), the catalyst warm-up operation execution device is configured to, when both the forced charging operation and the catalyst warm-up operation are executed at the same time (see affirmative determination in step 305 and negative determination in step 320 in FIG. 3, and affirmative determination in step 410, and step 450 in FIG. 4), set (limit) the retardation amount of the ignition timing such that the retardation amount is smaller than or equal to the maximum value of the retardation amount (Adanki in the case where Artd, Ata=0) in the case where the catalyst warm-up operation is executed and the forced charging operation is not executed and the retardation amount reduces as the load (KL) of the internal combustion engine increases (see step 335 in FIG. 3, step 630 to step 645 in FIG. 6 and FIG. 7).

Thus, even when the load of the engine 20 increases during the forced charging operation, the retardation amount of the ignition timing is restricted, so it is possible to suppress fluctuations of torque generated by the engine 20. As a result, it is possible to prevent large tooth hammer sound from being generated in the power transmission mechanism.

Furthermore, it may be understood that, when the additional retardation amount Ata obtained in step 620 of FIG. 6 is "0", the catalyst warm-up operation execution device is configured to determine the reference retardation amount on the basis of the load (KL) of the internal combustion engine and the catalyst temperature parameter (coolant temperature THW) (see step 615 in FIG. 6), use the determined reference retardation amount as the predetermined retardation amount when the forced charging operation is not executed and the catalyst warm-up operation is executed (see step 625, negative determination in step 630, and step 650 in FIG. 6), and use a limited retardation amount (retardation amount limited by Amax) obtained by limiting the determined reference retardation amount using a retardation limit value (Amax), which reduces as the load of the internal combustion engine increases, in the case where both the forced charging operation and the catalyst warm-up operation are executed at the same time, as the predetermined retardation amount (see step 630 to step 650 in FIG. 6).

The invention is not limited to the above-described embodiment; various alternative embodiments may be employed within the scope of the invention. For example, in the above-described embodiment, when the catalyst warm-up operation (control) is executed during the forced charging operation, the sum Artd of the additional retardation amount Ata and the catalyst warm-up retardation amount Adanki is limited so as to be smaller than or equal to the retardation amount limit value Amax; instead, only the catalyst warm-up retardation amount Adanki may be limited so as to be smaller than or equal to the retardation amount limit value Amax. In addition, the additional retardation amount Ata may be constantly "0". Furthermore, an initial value of the catalyst warm-up retardation amount Adanki may be determined on the basis of the coolant temperature THW at the time of a system start-up and, after that, the catalyst warm-up retardation amount Adanki may be attenuated by a predetermined amount at a time as a period of time elapses or as the engine 20 rotates. In this case, when the catalyst warm-up retardation amount Adanki becomes smaller than or equal to the retardation amount limit value Amax as a result of attenuation, the ignition timing may be retarded using the catalyst warm-up retardation amount Adanki.

Furthermore, in the above-described embodiment, the retardation amount of the ignition timing is limited so as to be smaller than or equal to the retardation amount limit value Amax at the time when catalyst warm-up control is executed during the forced charging operation. Instead, it is also applicable that the table MapAdanki (KL, THW) (see step 615 in FIG. 6) used to obtain the catalyst warm-up retardation amount Adanki in the case where the forced charging operation is not being executed and a table MapAdankiJ(KL, THW) used to obtain the catalyst warm-up retardation amount Adanki in the case where the forced charging operation is being executed are stored in the ROM as separate tables and then the catalyst warm-up retardation amount Adanki in the case where the forced charging operation is being executed is obtained from the table MapAdankiJ(KL, THW). In this case, the table MapAdankiJ(KL, THW) may predetermine the catalyst warm-up retardation amount Adanki in the case where the forced charging operation is being executed such that the catalyst warm-up retardation amount Adanki becomes a retardation amount that is smaller than or equal to the catalyst warm-up retardation amount Adanki in the case where the forced charging operation is not being executed and that reduces as the load KL increases.

In addition, limiting the retardation amount of the ignition timing using the above-described retardation amount limit value Amax may be executed only when the vehicle speed is lower than or equal to a vehicle stop determination threshold vehicle speed (for example, 3 km/h) at or below which it is possible to determine that the hybrid vehicle 10 is substantially stopped. This is because, when the hybrid vehicle 10 is travelling, large torque acts on the power transmission mechanism in one direction irrespective of whether the hybrid vehicle 10 is accelerating or decelerating and, as a result, tooth hammer sound is hard to occur.

In the above-described embodiment, the coolant temperature THW is used as the catalyst temperature parameter; instead, when the catalyst 27 includes a catalyst bed temperature sensor, the temperature detected by the catalyst bed temperature sensor may be used as the catalyst temperature parameter. Furthermore, in the above-described embodiment, the remaining level SOC is used as the remaining level parameter; instead, an instantaneous outputtable electric power of the battery 63 may be used as the remaining level parameter.

Furthermore, in the above-described embodiment, the catalyst warm-up operation and/or the forced charging operation are started at the time of a system start-up; instead, for example, these operations may be started when the shift position is the parking position or the neutral position and the vehicle speed SPD is lower than or equal to the vehicle stop determination threshold vehicle speed.

Furthermore, as long as a hybrid vehicle is configured to be able to drive the generator using the power of the engine 20 in the case where the engine 20 is operated through the forced charging operation, and to transmit the power of the engine 20 to the drive shaft at the same time (particularly, transmit the power of the engine 20 via a gear mechanism), the hybrid vehicle is not limited to the hybrid vehicle 10 according to the above-described embodiment. That is, the invention is applicable to a hybrid vehicle that includes an internal combustion engine, a generator that generates electric power as it is driven by power generated by the internal combustion engine so as to supply electric power to an electrical storage device, an electric motor, and a power transmission mechanism that couples the internal combustion engine to a drive shaft of the vehicle such that torque is transmittable and that couples the electric motor to the drive shaft of the vehicle such that torque is transmittable.

The invention claimed is:

1. A hybrid vehicle comprising:
an internal combustion engine including an exhaust gas purification catalyst in an exhaust passage;
an electric motor;
an electrical storage device configured to supply the electric motor with electric power for driving the electric motor;
a generator configured to generate electric power for charging the electrical storage device using power of the internal combustion engine;
a power transmission mechanism configured to couple a drive shaft of a vehicle to the internal combustion engine such that torque is transmitted, the power transmission mechanism configured to couple the drive shaft to the electric motor such that torque is transmitted; and
a control device configured to generate torque required to rotate the drive shaft by controlling at least torque generated by the internal combustion engine and torque generated by the electric motor,
the control device configured to change the electric power generated by the generator by controlling the power generated by the internal combustion engine,
the control device configured to execute catalyst warm-up operation for starting the internal combustion engine and for retarding an ignition timing of the internal combustion engine by a predetermined retardation amount with respect to a reference ignition timing when a catalyst temperature parameter is lower than or equal to a predetermined temperature correlated threshold, the catalyst temperature parameter correlating with a temperature of the catalyst,
the control device configured to execute a forced charging operation for charging the electrical storage device by starting the internal combustion engine when a remaining level parameter correlating with a remaining level of the electrical storage device is lower than or equal to a predetermined remaining level correlated threshold, and by causing the generator to generate electric power by operating the internal combustion engine while changing a load required for the internal combustion engine based on the remaining level parameter, and
the control device configured to reduce the retardation amount as the load of the internal combustion engine increases when both the forced charging operation and the catalyst warm-up operation are executed at the same time.

2. The hybrid vehicle according to claim 1, wherein
the control device is configured to, in the catalyst warm-up operation, set the predetermined retardation amount when both the forced charging operation and the catalyst warm-up operation are executed to a value that is smaller than or equal to a maximum value of the predetermined retardation amount, when the forced charging operation is not executed and the catalyst warm-up operation is executed.

3. The hybrid vehicle according to claim 1, wherein
the control device is configured to, in the catalyst warm-up operation, determine a reference retardation amount based on the load of the internal combustion engine and the catalyst temperature parameter,
the control device is configured to use the determined reference retardation amount as the predetermined retardation amount when the forced charging operation is not executed and the catalyst warm-up operation is executed, and
the control device is configured to use a limited retardation amount, the limited retardation amount is obtained by limiting the determined reference retardation amount by a retardation limit value, the retardation limit value reduces as the load of the internal combustion engine increases, as the predetermined retardation amount when both the forced charging operation and the catalyst warm-up operation are executed.

4. The hybrid vehicle according claim 1, wherein
the control device is configured to, in the catalyst warm-up operation, start the catalyst warm-up operation when the catalyst temperature parameter is lower than or equal to the predetermined temperature correlated threshold at the time of a start-up of a system of the hybrid vehicle, and
in the forced charging operation the forced charging operation is started when the remaining level parameter is lower than or equal to the predetermined remaining level correlated threshold at the time of the start-up of the system.

5. The hybrid vehicle according to claim 1, wherein
the power transmission mechanism couples the internal combustion engine to the drive shaft via only a plurality of gears.

6. A control method for a hybrid vehicle that includes:
an internal combustion engine including an exhaust gas purification catalyst in an exhaust passage;
an electric motor;
an electrical storage device configured to supply the electric motor with electric power for driving the electric motor;
a generator configured to generate electric power for charging the electrical storage device using power of the internal combustion engine;
a power transmission mechanism configured to couple a drive shaft of a vehicle to the internal combustion engine such that torque is transmitted, the power transmission mechanism configured to couple the drive shaft to the electric motor such that torque is transmitted, and
a control device,
the control method comprising:
executing, by the control device, catalyst warm-up operation for starting the internal combustion engine and for retarding an ignition timing of the internal combustion engine by a predetermined retardation amount with respect to a reference ignition timing when a catalyst temperature parameter is lower than or equal to a predetermined temperature correlated threshold the catalyst temperature parameter correlating with a temperature of the catalyst;
executing, by the control device, a forced charging operation for charging the electrical storage device by starting the internal combustion engine when a remaining level parameter correlating with a remaining level of the electrical storage device is lower than or equal to a predetermined remaining level correlated threshold, and by causing the generator to generate electric power by operating the internal combustion engine while changing a load required for the internal combustion engine based on the remaining level parameter; and
reducing, by the control device, the retardation amount as the load of the internal combustion engine increases when both the forced charging operation and the catalyst warm-up operation are executed at the same time.

* * * * *